US007191534B2

(12) United States Patent
Szumer et al.

(10) Patent No.: US 7,191,534 B2
(45) Date of Patent: Mar. 20, 2007

(54) HANDHELD LAYOUT AND MARKING TOOL

(75) Inventors: Emanual Szumer, Buderim (AU); Amy Levinson, Upper Galilee (IL)

(73) Assignee: Kapro Industries Ltd., Bikat Beit Hakerem (IL)

( * ) Notice: Subject to any disclaimer, the term of this patent is extended or adjusted under 35 U.S.C. 154(b) by 16 days.

(21) Appl. No.: 10/546,797

(22) PCT Filed: Feb. 23, 2004

(86) PCT No.: PCT/IL2004/000175

§ 371 (c)(1), (2), (4) Date: Aug. 24, 2005

(87) PCT Pub. No.: WO2004/074001

PCT Pub. Date: Sep. 2, 2004

(65) Prior Publication Data

US 2006/0174504 A1 Aug. 10, 2006

(30) Foreign Application Priority Data

Feb. 24, 2003 (DE) .......................... 203 03 041 U
Feb. 24, 2003 (DE) .......................... 203 03 042 U

(51) Int. Cl.

| | |
|---|---|
| ***B43L 7/00*** | (2006.01) |
| ***B43L 7/02*** | (2006.01) |
| ***G01D 21/00*** | (2006.01) |

(52) U.S. Cl. ............................ 33/484; 33/613; 33/478

(58) Field of Classification Search .................. 33/613, 33/483, 484, 485, 32.3, 644, 666, 669, 474, 33/478, 487

See application file for complete search history.

(56) References Cited

U.S. PATENT DOCUMENTS

| | | | | |
|---|---|---|---|---|
| 1,376,559 | A | 5/1921 | McKeown | |
| 2,958,133 | A * | 11/1960 | Seitz | 33/42 |
| 3,439,426 | A * | 4/1969 | Wilson | 33/32.2 |
| 4,702,012 | A | 10/1987 | Miller | |
| 5,471,749 | A * | 12/1995 | Brady | 33/484 |
| 5,471,753 | A * | 12/1995 | Rodrigues | 33/42 |
| 5,598,637 | A * | 2/1997 | Liu | 33/526 |
| 5,732,472 | A | 3/1998 | Praye | |
| 5,832,618 | A * | 11/1998 | Scarborough | 33/451 |
| 6,629,370 | B1 * | 10/2003 | Sposato | 33/42 |
| 6,807,743 | B2 * | 10/2004 | Odachowski | 33/465 |
| 6,973,733 | B2 * | 12/2005 | Levine | 33/484 |

FOREIGN PATENT DOCUMENTS

| | | |
|---|---|---|
| WO | WO 95/31314 A | 11/1995 |

* cited by examiner

*Primary Examiner*—Christopher W. Fulton
(74) *Attorney, Agent, or Firm*—The Nath Law Group; Harold L. Novick

(57) ABSTRACT

A handheld layout and marking tool including a rule-like member and a sliding handgrip for sliding to a user desire position. The sliding handgrip preferably includes an integrally formed braking device rendering a one hand operable combined sliding handgrip and braking device. A handheld layout and marking tool having a headpiece and a detachable rule-like member for insertion into the headpiece lengthwise to interchangeably form either a framing square or a T-square.

18 Claims, 6 Drawing Sheets

HANDHELD LAYOUT AND MARKING TOOL

CROSS-REFERENCE TO RELATED APPLICATIONS

This application is the U.S. National Stage filing of PCT Application PCT/Il2004/000175 having an international filing date of Feb. 23, 2004.

FIELD OF THE INVENTION

The invention is in the field of handheld layout and marking tools.

BACKGROUND OF THE INVENTION

A wide range of handheld layout and marking tools are commercially available from the present invention's assignee Kapro Industries Ltd., Kibbutz Kadarim, Israel (see www.kapro.com>products>layout and marking). One such handheld layout and marking tool is a ruler 10 with a fixed center handgrip 11 as shown in FIG. 1, for example, Kapro's Ruler/Cutting Edge—Model No. 312. Use of such a ruler suffers from the fact that during certain layout and marking applications, for example, cutting a dryboard, trimming a carpet, and the like, the ruler tends to undesirably cant from its intended orientation despite the downward force the user applies to the handgrip to hold the ruler steady. The risk of canting apart from making a layout and marking task more troublesome and time consuming may even lead to personal injury in the case that a cutting implement slips during a cutting operation. To prevent canting, a user typically only uses the ruler's middle region effectively restricting its fly operative length to a fraction of its actual length and thereby requiring that a user move the ruler more times than he would otherwise have to if he could use its entire length.

Different handheld layout and marking tools for layout and marking applications relative a reference line include inter alia framing squares, T-squares, combination squares, bevel squares, and the like. Exemplary framing squares including inter alia Kapro's Framing Square Model No. 307 typically have a fixed L-shaped frame 12 with a headpiece 13 having parallel straight measuring edges and a rule-like member 14 for placing flat on a flat surface possibly with either one of its measuring edges being abutted against a surface, for example, a wall, a skirting board, and the like (see FIGS. 2 and 3). Exemplary T-squares including inter alia Kapro's Dry Wall T-Square—Model No. 316 typically have a fixed T-shaped frame 16 with a headpiece 17 and a rule-like member 18 for abutment of the headpiece's front wall against an edge of a flat surface, for example, a plasterboard, a plank, and the like, and the placing of the rule-like member flat on the flat surface (see FIGS. 4 and 5). The fixed nature of framing and T-squares inconveniences users during their transportation and moreover a user is further often inconvenienced that he has to carry both tools for different layout and marking applications.

SUMMARY OF THE INVENTION

The first aspect of the present invention is directed to a handheld layout and marking tool including a longitudinally directed rule-like member with at least one retaining track, and a sliding handgrip shaped and dimensioned to be comfortably held in a user's loosely clenched fist for slidingly displacement along the rule-like element to a user desired position. Thus, a user may readily reposition the sliding handgrip at several locations staggered along the rule-like member during, say, a cutting operation, thereby safely utilizing its full length without the risk of canting. The sliding handgrip is preferably implemented as a one hand operable combined sliding handgrip and braking device for selectively positively securing the rule-like member at a user desired position rather than relying on the downward force applied to the sliding handgrip for steadying the rule-like member with respect to the surface on which it is placed for also steadying the sliding handgrip with respect to the rule-like member. Thus, the sliding handgrip and particularly the combined sliding handgrip and braking device enable the provision of longer than hitherto commercially available rule-like members. The combined sliding handgrip and braking device preferably employs the same means for slidingly mounting the sliding handgrip on the rule-like member for frictionally engaging the rule-like member for braking purposes. Alternatively, an additional braking element may be provided. A pair of vial bearing clamps can be slidingly mounted on the rule-like member as illustrated and described in assignee's WO 02/10672 entitled Measuring and Leveling Device and Method of Using Same with or without the sliding handgrip in which the clamps are free to be positioned anywhere along the entire length of the rule-like member.

The second aspect of the present invention is directed to a handheld layout and marking tool including a headpiece for insertion of a detachable rule-like member lengthwise thereinto to form either a framing square or a T-square thereby replacing two conventional tools by a single tool. This is achieved by providing the headpiece with two insertion apertures at different heights with respect to its base surface, the first being adapted such that the assembled tool has a single planar base surface for placing on a flat surface in a similar manner to a framing square and the second being adapted such that the rule-like member's base surface is raised with respect to the headpiece's base surface for use of the assembled tool as a T-square. Moreover, the handheld layout and marking tool of the present invention is also more convenient to carry than a conventional framing square or T-square since the headpiece can be clipped lengthwise underneath the rule-like member for carrying therewith.

BRIEF DESCRIPTION OF THE DRAWINGS

In order to understand the invention and to see how it can be carried out in practice, preferred embodiments will now be described, by way of non-limiting examples only, with reference to the accompanying drawings in which similar parts are likewise numbered, and in which.

DESCRIPTION OF PREFERRED EMBODIMENTS OF THE INVENTION

Figure 1:
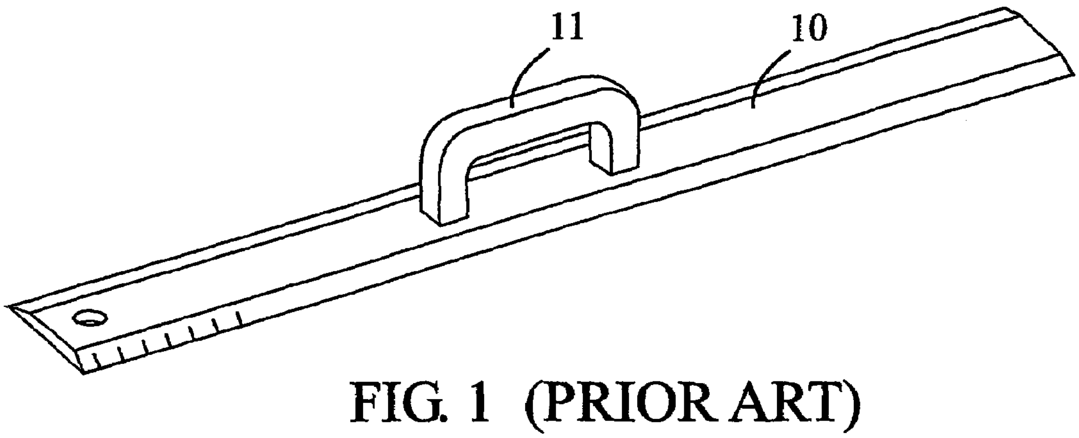
FIG. 1 (PRIOR ART)
FIG. 1 is a perspective view of a conventional ruler with a fixed handgrip.
Figure 2:
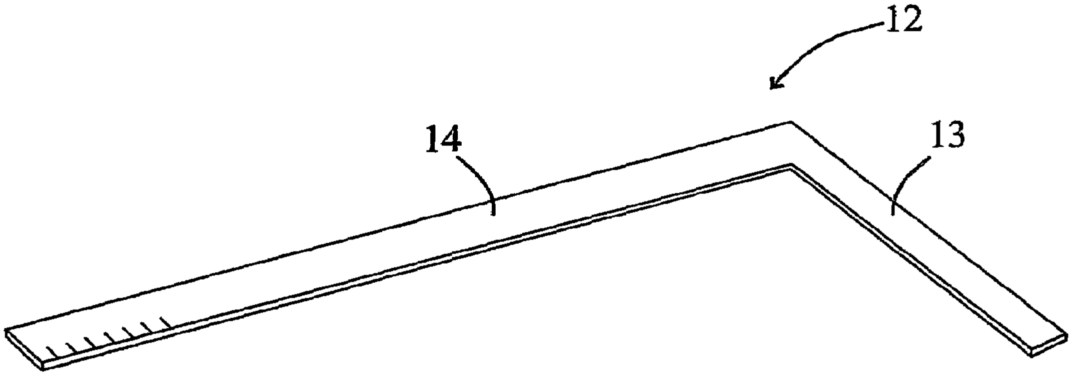
FIG. 2 (PRIOR ART)
FIG. 2 a perspective view of a conventional framing square.
Figure 3:
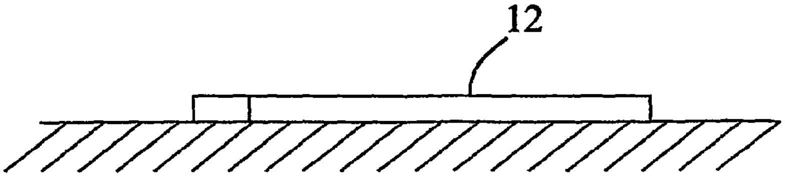
FIG. 3 (PRIOR ART)
FIG. 3 is a side view of FIG. 2's framing square on a flat surface.
Figure 4:
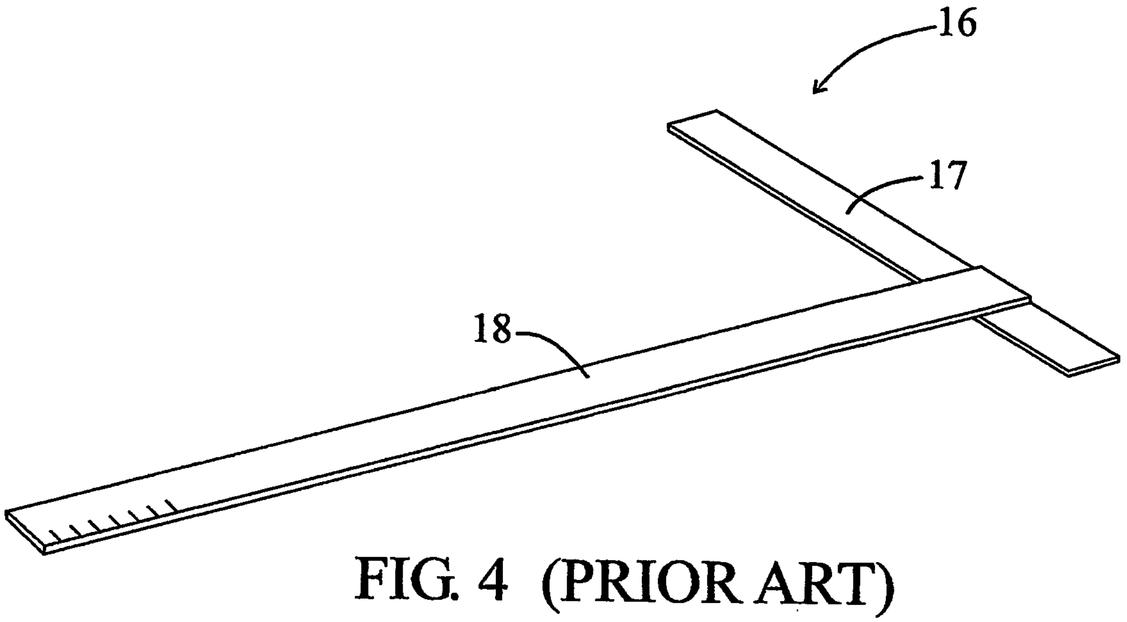
FIG. 4 (PRIOR ART)
FIG. 4 is a perspective view of a conventional T-square.
Figure 5:
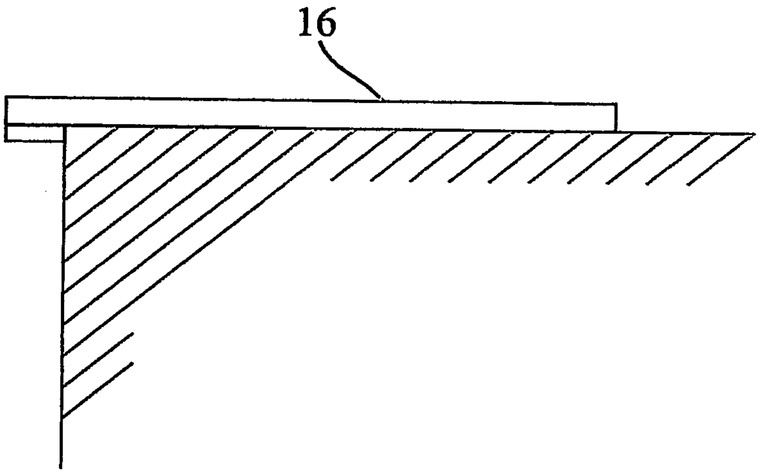
FIG. 5 (PRIOR ART)
FIG. 5 is a side view of FIG. 4's T-square on a flat surface.
Figure 6:
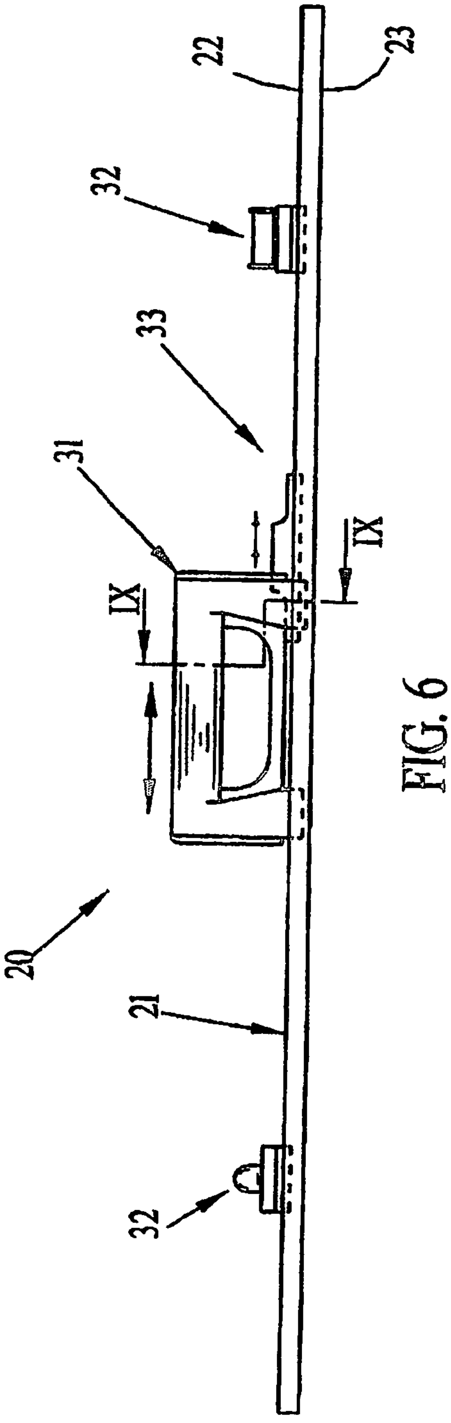
FIG. 6 is a front view of a handheld layout and marking tool with a combined sliding handgrip and braking device in accordance with a first aspect of the present invention.
Figure 7:
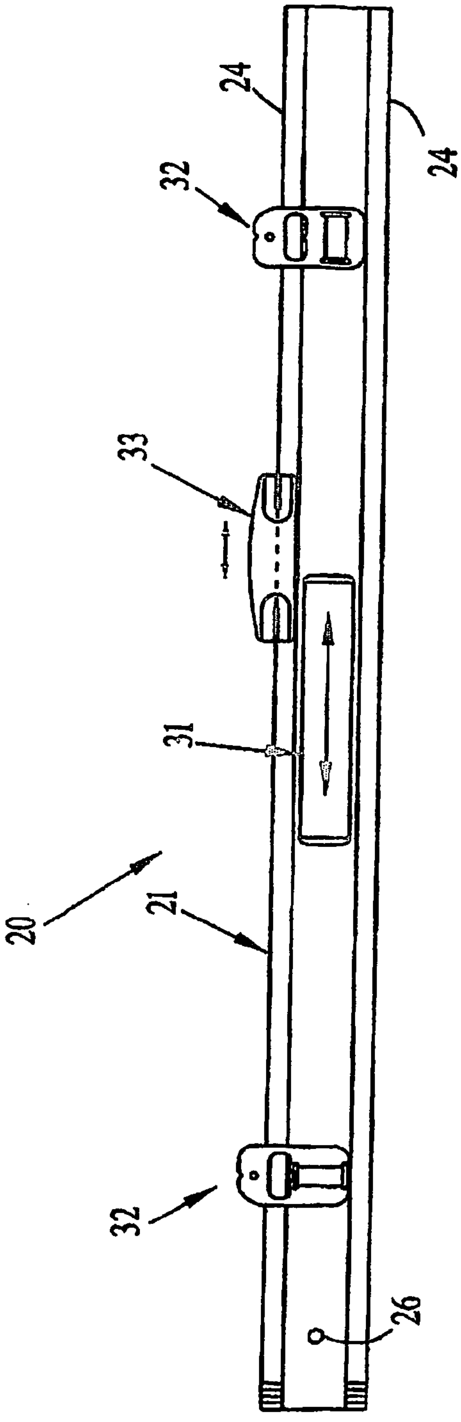
FIG. 7 is a top view of the tool of FIG. 6.

FIGS. 6 and 7 show a handheld layout and marking tool 20 including an extruded aluminum rule-like member 21 with a top surface 22, a base surface 23, a pair of straight measuring edges 24 with imperial and/or metric scales for measuring distances between selected points, and a throughgoing hang hole 26 for hanging onto a peg, a nail, and the like. The rule-like member 21 includes an inner pair of retaining tracks 27A and 27B, an outer pair of retaining tracks 28A and 28B, and a pair of outermost support flanges 29A and 29B (see FIG. 9). The retaining tracks 27A and 27B slidingly support a one-piece plastic molded combined sliding handgrip and braking device 31 and/or a pair of slidingly movable, lockable, pressure releasable clamps 32 as illustrated and described in the afore-mentioned PCT International Publication No. WO 02/10672. The retaining tracks 28A and 28B slidingly supporting a so-called horizontal knife guide 33 for guiding a cutting implement 34 (see FIG. 9) past the combined sliding handgrip and braking device 31. The purpose of the support flanges 29A and 29B is described hereinbelow with reference to FIGS. 10–15.

Figure 8:
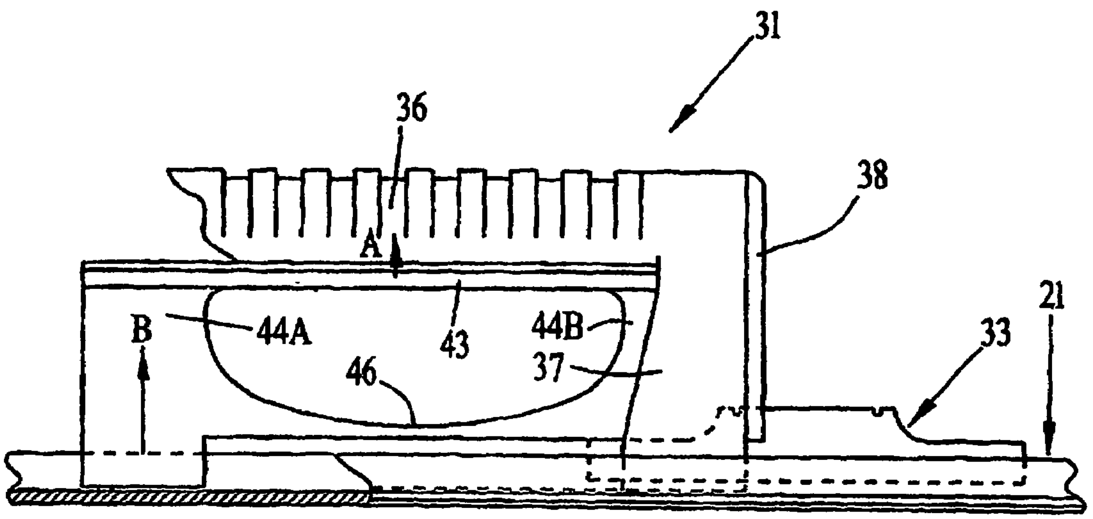
FIG. 8 is a close up view of the combined sliding handgrip and braking device of the tool of FIG. 6.
Figure 9:
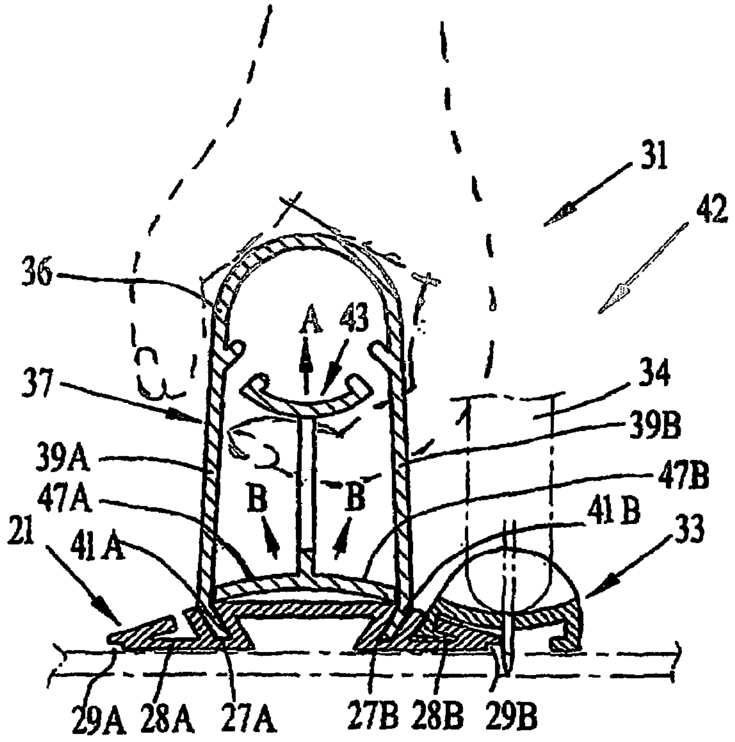
FIG. 9 is a view of the tool of FIG. 6 during a cutting operation along section line IX—IX.

FIGS. 8 and 9 show that the combined sliding handgrip and braking device 31 includes a longitudinally directed crossbar 36 supported at its opposite ends by a pair of inverted U-shaped end supports 37 fitted with end caps 38. Each end support 37 includes a pair of opposite side walls 39A and 39B terminating in a pair of opposite inwardly and downwardly inclined longitudinally directed tabs 41A and 41B for sliding displacement along the retaining tracks 27A and 27B. The combined sliding handgrip and braking device 31 includes an actuator 42 including a longitudinally directed handle 43 co-extensive with and underlying the crossbar 36 such that they can both be comfortably held in a user's loosely clenched fist with the front surfaces of his fingers touching the handle's underside thereby enabling one hand operation for sliding the combined sliding handgrip and braking device 31 to a user desired location along the rule-like member 21 and braking thereat. The handle 43 is supported at its opposite ends by a pair of downwardly depending inverted T-shaped support members 44A and 44B interconnected by a crosspiece 46 parallel to the handle 43 for providing rigidity to the combined sliding handgrip and braking device 31. Each support member 44 has a pair of widthwise extending wing portions 47A and 47B connected to their adjacent side walls 39A and 39B above their corresponding tabs 41 such that upward urging of the handle 43 towards the crossbar 36 as denoted by arrow A deforms the wing portions 47A and 47B towards the crossbar 36 as denoted by arrow B which in turn urges the tabs 41A and 41B into frictional engagement with the retaining tracks 27A and 27B thereby effecting the braking of the combined sliding handgrip and braking device 31 at the user desired position.

Figure 10:
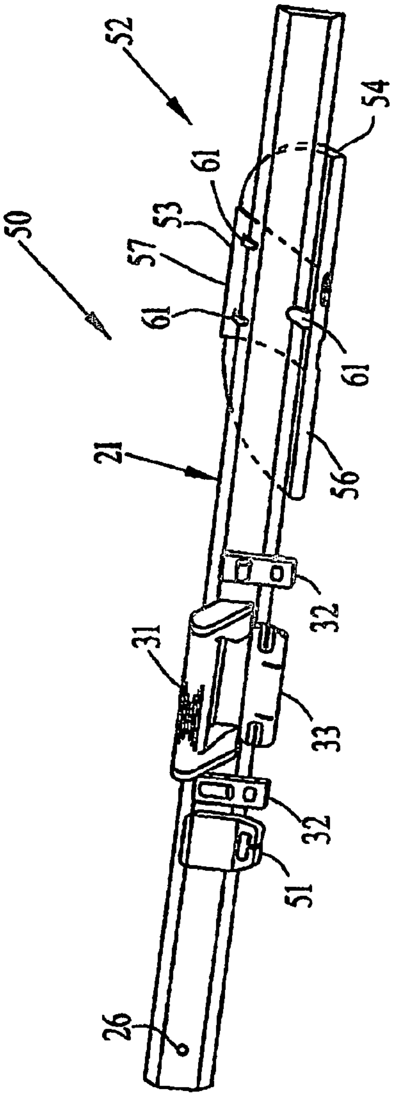
FIG. 10 is a perspective view showing the carrying mode of a handheld layout and marking tool capable of being assembled as either a framing square or a T-square in accordance with a second aspect of the present invention.
Figure 11:
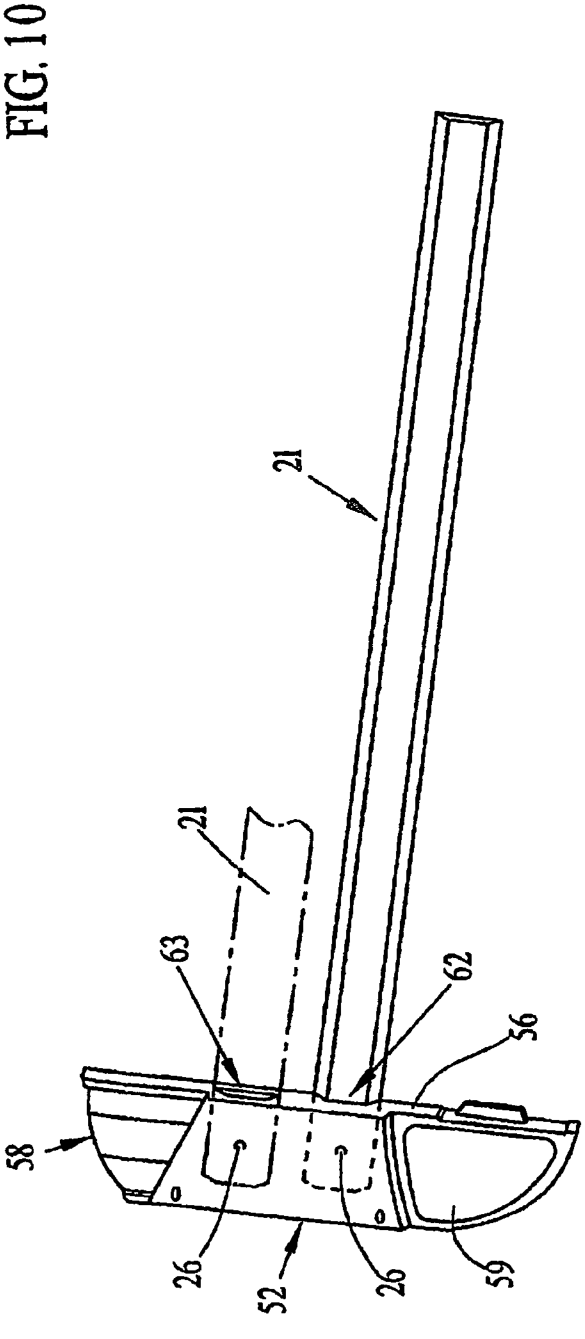
FIG. 11 is a perspective view of FIG. 10's handheld layout and marking tool assembled as a framing square in solid lines and a T-square in dashed lines.

FIG. 10 shows a handheld layout and marking tool 50 capable of being assembled as either a framing square 10 or a T-square 16 for use in layout and marking applications on a flat surface having an edge. The tool 50 includes the rule-like member 21, the combined sliding handgrip and braking device 31, the clamps 32, the horizontal knife guide 33, a vertical knife guide 51, and a headpiece 52. The headpiece 52 has a general box-like construction with a top surface 53, a base surface 54, a straight front wall 56, and a rear wall 57. The headpiece 52 includes a docking station 58 for slidingly receiving the clamps 32 and the vertical knife guide 51 when not in use (see FIG. 12), and a clip-open storage compartment 59 for storing the horizontal knife guide 33, nails, screws, and the like. The headpiece's top surface 53 is provided with clips 61 such that the headpiece 52 can be slidingly stowed underneath the rule-like member 21 for carrying purposes.

The headpiece's front wall 56 includes a pair of insertion apertures 62 and 63 shaped and dimensioned for interchangeably slidingly receiving the rule-like member 21 therein lengthwise to subtend a rightangle between the headpiece's front wall 56 and the rule-like member's measuring edges 24. The assembled tool 50 resulting from the insertion of the rule-like member 21 into the insertion aperture 62 has a single planar base surface 64, namely, the rule-like member's base surface 23 and the headpiece's base surface 54 are flush with one another, for placement on a flat surface thereby effectively rendering a framing square (see FIGS. 11 and 14) whilst the assembled tool 50 resulting from the insertion of the rule-like member 21 into the insertion aperture 63 has a stepped base surface 66 for abutment of the headpiece's front wall 56 against a flat surface's edge and placement of the rule-like member's base surface 23 thereon (see FIGS. 11 and 15).

Figure 12:
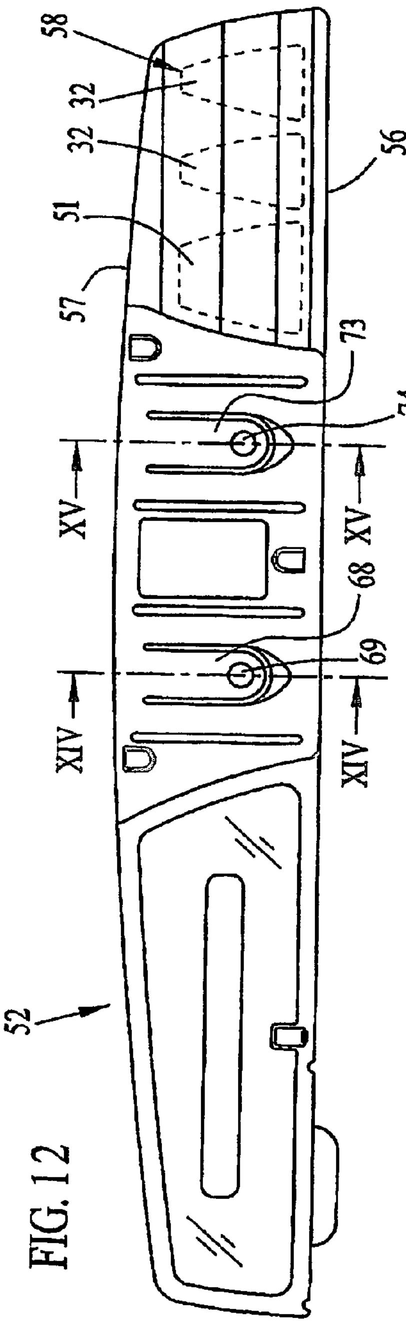
FIG. 12 is a top view of a headpiece of FIG. 10's handheld layout and marking tool.
Figure 13:
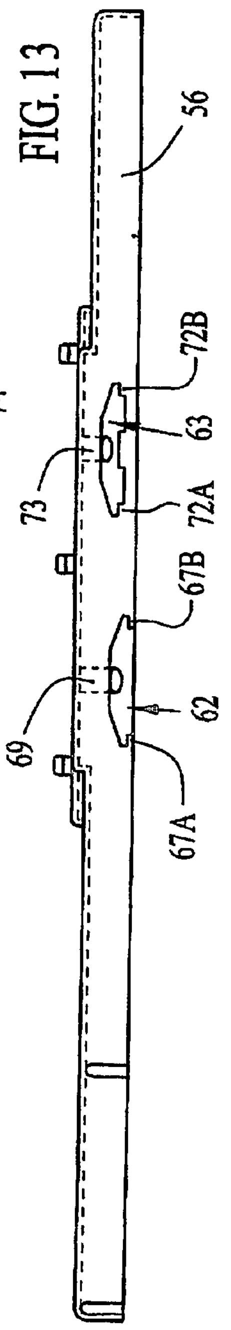
FIG. 13 is a front view of FIG. 12's headpiece.
Figure 14:
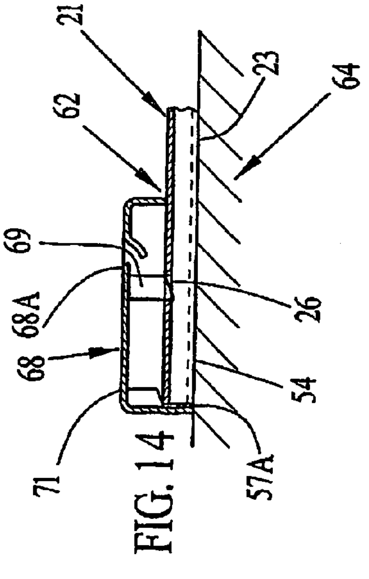

FIGS. 12–14 show that the insertion aperture 62 includes a pair of runners 67A and 67B, a resiliently flexibly hinged cantilevered securing member 68 with a beveled downward depending cylindrical projection 69 towards its free leading end 68A, and a downwardly depending stopper 71 for securing the rule-like member 21 on its full insertion thereinto to prevent any pitch or yaw movement of the rule-like member 21 relative to the headpiece 52. The runners 67A and 67B respectively slidingly support the rule-like member's support flanges 29A and 29B and prevent any sideways movement relative to the headpiece 52. The runners 67A and 67B together with the stopper 71 which bears against the extreme end of the rule-like member's top surface 22 on its full insertion into the insertion aperture 62, namely, on its abutment against the back wall's interior surface 57A further restrain movement of the relatively short length of the rule-like member 21 within the confines of the insertion aperture 62. The projection 69 snap fits into the rule-like member's throughgoing hang hole 26 on the full insertion of the rule-like member 21 into the insertion aperture 62 for releasable locking of the rule-like member 21 in the headpiece 52. Removal of the rule-like member 21 from the insertion aperture 62 for insertion into the insertion adjacent 63 or carrying purposes involves insertion of a user's fingertip under the free leading end 68A to urge the projection 69 upwards away from the headpiece 52 thereby enabling the withdrawal of the rule-like member 21.

Figure 15:
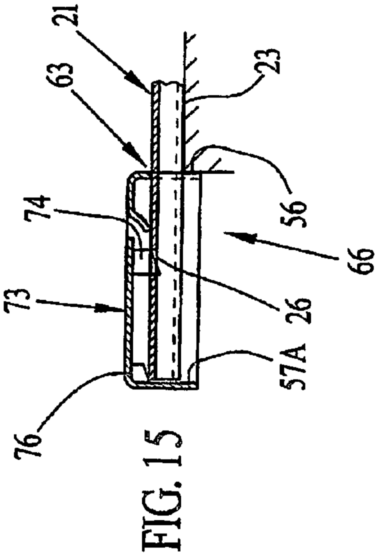
FIGS. 14 and 15 are views of FIG. 12's headpiece along section lines XIV—XIV and XV—XV respectively.

FIGS. 12, 13 and 15 show that the insertion aperture 63 has a construction similar to the insertion aperture 62 for securing the rule-like element 21 therein, namely, it includes, a pair of runners 72A and 72B, a resiliently flexibly hinged cantilevered securing member 73 with a downwardly depending projection 74, and a downwardly depending stopper 76, the difference being that the projection 74 is shorter than the stopper 71 and similarly the stopper 76 is shorter than the stopper 61 to reflect the fact that the insertion aperture 63 is higher than the insertion aperture 62 raised relative to the headpiece's base surface 54.

While the invention has been described with respect to a limited number of embodiments, it will be appreciated that many variations, modifications, and other applications of the invention can be made within the scope of the appended claims.

The invention claimed is:

1. A handheld layout and marking tool comprising a longitudinal rule-like member with at least one straight measuring edge for measuring distances between selected points and at least one longitudinally directed retaining track, and a sliding handgrip having a longitudinally directed crossbar raised with respect to said rule-like member and shaped and dimensioned so as to be comfortably held in a user's loosely clenched fist for slidingly displacement along said rule-like element to a user desired position, said sliding handgrip further including a braking device integrally formed therewith to render a combined sliding handgrip and braking device including an actuator with a longitudinally directed handle coextensive with and underlying said crossbar such that said crossbar and said handle can be both comfortably held in the user's loosely clenched fist with the front surfaces of his fingers touching said handle's underside for selective upward urging toward said crossbar thereby enabling one hand operation for sliding said combined sliding handarip and braking device to a user desired position along said rule-like member and braking thereat.

2. The tool according to claim 1 wherein said selective upward urging of said handle toward said crossbar frictionally engages at least one retaining track for braking said combined sliding handgrip and braking device at said user desired position.

3. The tool according to claim 2 wherein said rule-like member has a pair of parallel longitudinally directed retaining tracks, said handgrip has at least one end support supporting said longitudinally directed crossbar, and each said at least one end support has a Pair of opposite longitudinally directed tabs for sliding displacement along said pair of retaining tracks whereby selective upwardly urging said handle towards said crossbar resiliently elastically urges said pair of opposite longitudinally directed tabs into frictional engagement with said pair of parallel retaining tracks for braking said combined sliding handrail and braking device at said user desired position braking device at said user desired position.

4. The tool according to claim 3 wherein said at least one end support includes a pair of end supports supporting said longitudinally directed crossbar extending therebetween, each end support of said pair of end supports has a pair of opposite longitudinally directed tabs for sliding displacement along said pair of retaining tracks, whereby the selectively upwardly urging of said handle towards said crossbar for resiliently elastically urges urging said two pairs of opposite longitudinally directed tabs into frictional engagement with said pair of parallel retaining tracks for braking said combined sliding handgrip and braking device at said user desired position.

5. The tool according to claim 1 wherein said combined sliding handgrip and braking device is molded as a one-piece plastic part.

6. The tool according to claim 1 for use in layout and marking applications on a flat surface having an edge, said rule-like member having a top surface, and a base surface for placing flat on the flat surface, and the tool further comprising a headpiece with a base surface for placing flat on the flat surface and a pair of insertion apertures shaped and dimensioned for interchangeably receiving said rule-member therein lengthwise to subtend a right angle between said headpiece and a straight measuring edge of said rule-like member's at least one straight measuring edge whereupon on its insertion into a first insertion aperture of said at least two insertion apertures, the resulting assembled tool has a single planar base surface for flat placement on the flat surface whilst, on its insertion into a second insertion aperture of said at least two insertion apertures, the resulting assembled tool has a stepped base surface for abutment of its headpiece against the flat surface's edge and flat placement of its rule-like member's base surface thereon.

7. The tool according to claim 6 wherein an insertion aperture of said at least two insertion apertures includes a pair of runners for slidingly supporting the lengthwise insertion of said rule-like member thereinto, and a downwardly depending stopper for bearing against the extreme end of said rule-like member's top surface on its full insertion into said insertion aperture to restrain movement of the length of said rule-like element within said insertion aperture.

8. The tool according to claim 6 wherein said rule-like member includes a throughgoing hang hole at at least one end thereof and said headpiece includes a cantilevered securing member with a downward depending projection for snap fit insertion into a throughgoing hang hole of said rule-like member's said at least one throughgoing hang hole on full insertion of said rule-like member lengthwise into an insertion aperture of said at least two insertion apertures for securing said rule-like member in said headpiece.

9. The tool according to claim 6 wherein said first insertion aperture and said second insertion aperture are adjacent to one another.

10. A handheld layout and marking tool for use in layout and marking applications on a flat surface having an edge, the tool comprising a longitudinal rule-like member with a top surface, and a base surface for placing flat on the flat surface and at least one straight measuring edge for measuring distances between selected points, and a headpiece with a base surface for placing flat on the flat surface and a pair of insertion apertures shaped and dimensioned for interchangeably receiving said rule-member therein lengthwise to subtend a right angle between said headpiece and a straight measuring edge of said rule-like member's at least one straight measuring edge whereupon on its insertion into a first insertion aperture of said at least two insertion apertures, the resulting assembled tool has a single planar base surface for flat placement on the flat surface whilst, on its insertion into a second insertion aperture of said at least two insertion apertures, the resulting assembled tool has a stepped base surface for abutment of its headpiece against the flat surface's edge and flat placement of its rule-like member's base surface thereon.

11. The tool according to claim 10 wherein an insertion aperture of said at least two insertion apertures includes a pair of runners for slidingly supporting the lengthwise insertion of said rule-like member thereinto, and a downwardly depending stopper for bearing against the extreme end of said rule-like member's top surface on its full insertion into said insertion aperture to restrain movement of the length of said rule-like element within said insertion aperture.

12. The tool according to claim 10 wherein said rule-like member includes a throughgoing hang hole at at least one end thereof and said headpiece includes a cantilevered securing member with a downward depending projection for snap fit insertion into a throughgoing hang hole of said rule-like member's said at least one throughgoing hang hole on full insertion of said rule-like member lengthwise into an insertion aperture of said at least two insertion apertures for securing said rule-like member in said headpiece.

13. The tool according to claim 10 wherein said first insertion aperture and said second insertion aperture are adjacent to one another.

14. The tool according to claim 10 wherein said rule-like element further comprises at least one longitudinally directed retaining track, and the tool further comprising a sliding handgrip having a longitudinally directed crossbar raised with respect to said rule-like element and shaped and dimensioned so as to be comfortably held in a user's loosely clenched fist for slidingly displacement along said rule-like element to a user desired position;

said sliding handgrip further including a braking device integrally formed therewith to render a combined sliding handgrip and braking device including an actuator with a longitudinally directed handle coextensive with and underlying said crossbar such that said crossbar and said handle can be both comfortably held in the user's loosely clenched fist with the front surfaces of his fingers touching said handle's underside for selective upward urging toward said crossbar thereby enabling one hand operation for sliding said combined sliding handgrip and braking device to a user desired Position along said rule-like member and braking thereat.

15. The tool according to claim 14 wherein said selective upward urging of said handle toward said crossbar frictionally engaging said at least one retaining track for braking said combined sliding handgrip and braking device at said user desired position.

16. The tool according to claim 15 wherein said rule-like member has a Pair of Parallel longitudinally directed retaining tracks, said handgrip has at least one end support supporting said longitudinally directed crossbar, and each said at least one end support has a Pair of opposite longitudinally directed tabs for sliding displacement along said pair of retaining tracks whereby selective upwardly urging said handle towards said crossbar resiliently elastically urges said pair of opposite longitudinally directed tabs into frictional engagement with said pair of parallel retaining tracks for braking said combined sliding handarip and braking device at said user desired position braking device at said user desired position.

17. The tool according to claim 16 wherein said at least one end support includes a pair of end supports supporting said longitudinally directed crossbar extending therebetween, each end support of said pair of end supports has a pair of opposite longitudinally directed tabs for sliding displacement along said pair of retaining tracks, whereby the selectively upwardly urging of said handle towards said crossbar for resiliently elastically urges said two pairs of opposite longitudinally directed tabs into frictional engagement with said pair of parallel retaining tracks for braking said combined sliding handgrip and braking device at said user desired position.

18. The tool according to claim 14 wherein said combined sliding handgrip and braking device is molded as a one-piece plastic part.

* * * * *